(12) United States Patent
Gong

(10) Patent No.: US 6,205,288 B1
(45) Date of Patent: Mar. 20, 2001

(54) APPARATUS AND METHOD FOR REPRODUCING A VIDEO SIGNAL ACCORDING TO A VIDEO SIGNAL RECORDING MODE OF A DIGITAL VIDEO DISK AND A TELEVISION MODE

(75) Inventor: Jeong-Hyun Gong, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 08/904,349

(22) Filed: Jul. 31, 1997

(30) Foreign Application Priority Data

Aug. 5, 1996 (KR) .................................................. 96/32650

(51) Int. Cl.$^7$ ...................................................... H04N 5/91
(52) U.S. Cl. ........................... 386/131; 348/555; 348/556; 348/459; 386/125
(58) Field of Search ............................ 386/35, 131, 125; 348/554–556, 558, 459; H04N 5/91

(56) References Cited

U.S. PATENT DOCUMENTS

| | | | | |
|---|---|---|---|---|
| 5,005,077 | * | 4/1991 | Samad et al. | 358/140 |
| 5,229,853 | * | 7/1993 | Myers | 358/140 |
| 5,255,091 | * | 10/1993 | Lyon et al. | 358/140 |
| 5,457,499 | * | 10/1995 | Lim | 348/474 |
| 5,504,532 | * | 4/1996 | Rhodes | 348/458 |
| 5,530,484 | * | 6/1996 | Bhatt et al. | 348/556 |
| 5,631,710 | * | 5/1997 | Kamogawa et al. | 348/555 |
| 5,734,435 | * | 3/1998 | Wilson et al. | 348/459 |

* cited by examiner

Primary Examiner—Wendy Garber
Assistant Examiner—Vincent F. Boccio
(74) Attorney, Agent, or Firm—Staas & Halsey LLP

(57) ABSTRACT

An apparatus and method for reproducing a video signal of a digital video disk. The method includes the steps of checking a television mode; if the television mode is a PAL system, selecting a video processor in a PAL mode and checking a video signal mode recorded in the disk; and if the video signal recording mode is an NTSC system, selecting a video decoder in an NTSC mode so as to supply a pseudo PAL video signal to a television.

18 Claims, 3 Drawing Sheets

APPARATUS AND METHOD FOR REPRODUCING A VIDEO SIGNAL ACCORDING TO A VIDEO SIGNAL RECORDING MODE OF A DIGITAL VIDEO DISK AND A TELEVISION MODE

BACKGROUND OF THE INVENTION

1. Field of the Invention

The present invention relates to an apparatus and method for reproducing a video signal according to a video signal recording mode of a digital video disk and a television mode, and more particularly, to an apparatus and method for reproducing a video signal recorded by an NTSC (National Television System Committee) system in a disk according to a pseudo PAL (Phase Alternation by Line) system.

2. Description of the Related Art

A pseudo PAL system represents that only horizontal and vertical synchronization signals of a PAL system are changed to an NTSC system. The pseudo PAL system is used when trying to watch a video signal of the NTSC system by use of a television of the PAL system. Generally, the PAL system is different from the NTSC system in that one of I and Q signals is phase-shifted every scanning line when transmitted.

FIG. 1 illustrates a conventional pseudo PAL video signal reproducing apparatus. A YC separator 10 separates an analog composite video signal S1 of the NTSC system provided from a video source into a luminance signal Y and a color difference signal C. A color difference signal separator 20 separates the luminance signal Y and the color difference signal C into signals Y, R-Y and B-Y and a video synchronization signal sync on the basis of a chrominance signal frequency of 3.58 MHz. A video encoder 30 receives the signals Y, R-Y and B-Y and the video synchronization signal sync and generates a pseudo PAL video signal S2 based on a PAL system chrominance signal frequency of 4.43 MHz.

However, if the video signal is again mixed after it is separated into the signals Y, R-Y and B-Y, a part of the top and bottom of a screen becomes black and an aspect ratio of the entire screen varies. In other words, picture quality is degraded. Furthermore, circuit configurations are very complicated and a large number of variable components is needed, thereby lowering productivity.

SUMMARY OF THE INVENTION

It is an object of the invention to provide an apparatus and control method for preventing picture quality from deteriorating and simplifying circuit configurations so as not to use variable components when reproducing a video signal recorded by an NTSC system according to a pseudo PAL system.

It is another object of the invention to provide an apparatus and control method which can adaptively reproduce a video signal suitable for a television mode without degrading picture quality or without using variable components when a video signal recording mode is different from the TV mode.

The present invention includes a pseudo PAL video signal reproducing apparatus for reproducing information from a digital video disk and transferring a reproduced signal to a television. One embodiment of the pseudo PAL video signal reproducing apparatus includes an MPEG video decoder for generating digital video data by decoding an MPEG data stream reproduced from the disk in synchronization with a video clock supplied from the exterior and generating a PAL or NTSC video synchronization signal according to a select signal, a video processor for converting the digital video data to an analog video signal and generating a PAL or NTSC chrominance signal frequency according to the select signal, a key input section for selecting a television mode which is to provide a video signal reproduced from the disk in a PAL or NTSC mode, and a controller for selecting the MPEG video decoder and the video processor in the PAL or NTSC mode according to the television mode select information supplied from the key input section and disk information reproduced from the disk.

The present invention also includes a method for reproducing a pseudo PAL video signal in a digital video disk reproducing apparatus having an MPEG video decoder and a video processor. In one embodiment, the method includes the steps of checking a television mode, if the television mode is a PAL system, selecting the video processor in a PAL mode and checking a video signal mode recorded in the disk, and if the video signal recording mode is an NTSC system, selecting the video decoder as an NTSC mode so as to supply the pseudo PAL video signal to the television.

These and other objects, features and advantages of the invention will be further described and more readily apparent from a review of the detailed description of the preferred embodiment when taken in conjunction with the attached drawings. In the following description, numerous specific details are set forth to provide a more thorough understanding of the invention. It will be apparent, however, to one skilled in the art, that the invention may be practiced without these specific details. In other instances, well known features and constructions are not described so as not to obscure the invention.

DETAILED DESCRIPTION OF THE PREFERRED EMBODIMENT

Figure 1:
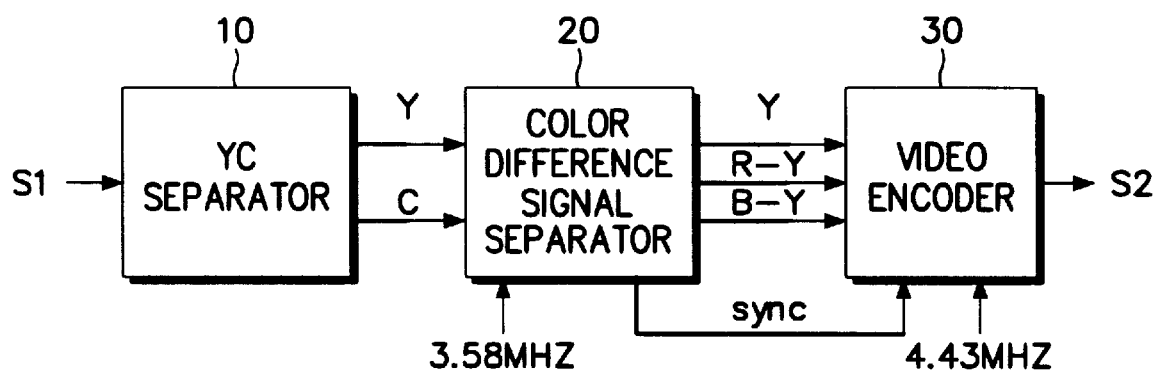
FIG. 1 is a block diagram illustrating a conventional pseudo PAL video signal reproducing apparatus.
Figure 2:
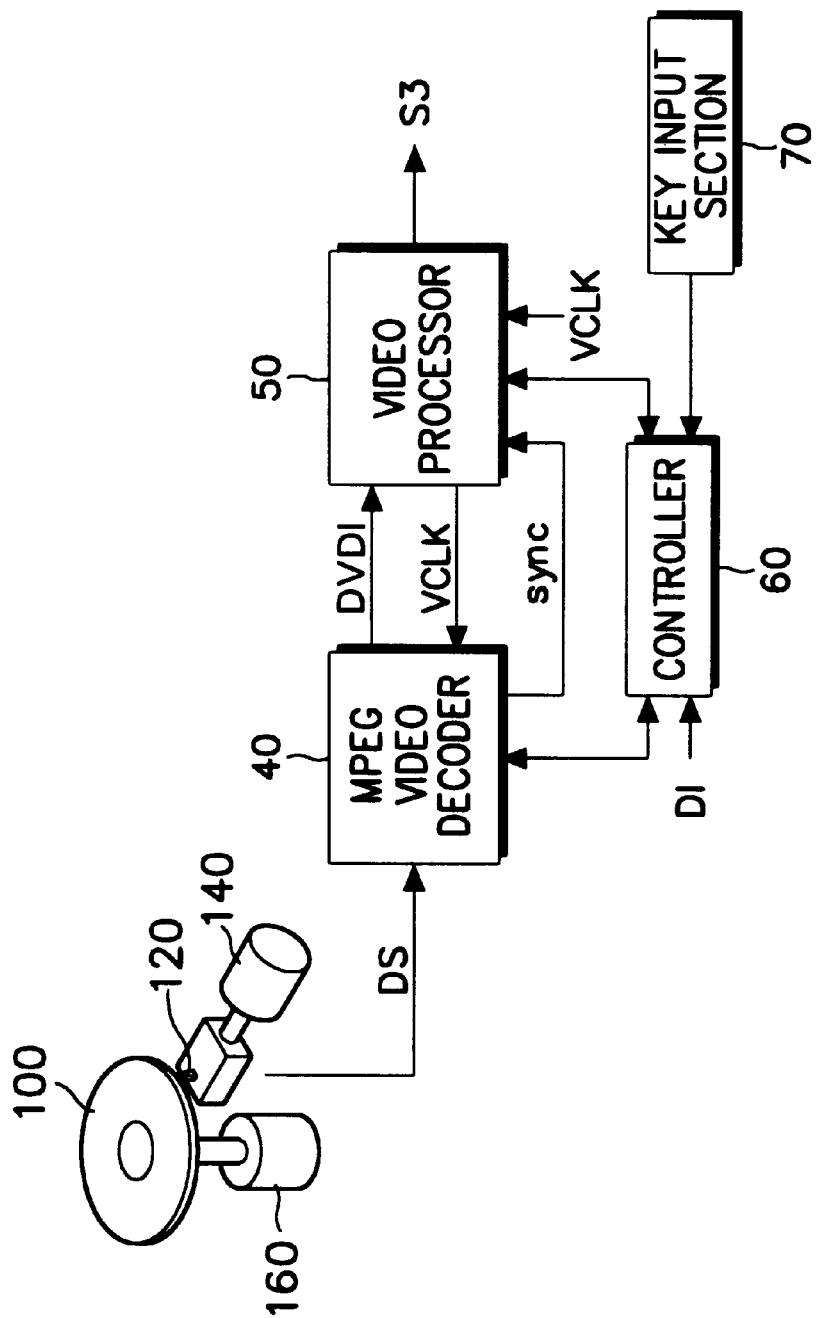
FIG. 2 is a block diagram illustrating a pseudo PAL video signal reproducing apparatus according to the present invention.

Referring to FIG. 2, when reproducing information from a digital video disk 100, a disk motor 160 starts to rotate at any speed. An optical pickup unit 140 having a head 120 converts the information of the disk 100 into an analog radio frequency (RF) signal. Although not shown in the drawings, this RF signal is shaped to a pulse waveform and a data stream DS is transferred to a digital PLL (Phase Locked Loop). An MPEG (Moving picture Experts Group) video decoder 40 receives the data stream DS reproduced from the disk 100 and generates digital video data DVD1 through known decoding processing. The MPEG video decoder 40 also generates a video synchronization signal sync of 25 Hz or 30 Hz. The decoding processing is performed in synchronization with a video clock VCLK supplied from the exterior. The MPEG video decoder 40 may be the "TC81201F" produced TOSHIBA Co. A video processor 50 receives the digital video data DVD and generates an analog video signal S3. The video processor 50 includes a clock generating unit for generating a chrominance signal frequency of 3.58 MHz if it is selected in an NTSC mode and generating the chrominance signal frequency of 4.43 MHz if it is selected in a PAL mode. A key input section 70 includes keys for selecting a television mode such as the NTSC or PAL mode. A controller 60 receives television mode select information provided from the key input section 70 and disk information DI provided from a servo portion, and controls an overall operation for reproducing a pseudo PAL video signal 53, in addition to controlling the MPEG video decoder 40 and the video processor 50. The controller 60 may use a microcomputer, having a memory which stores a control program for selecting the MPEG video decoder and the video processor in the PAL or NTSC mode. In FIG. 2, the controller is a one-chip microcontroller, that is, a MICOM.

Figure 3:
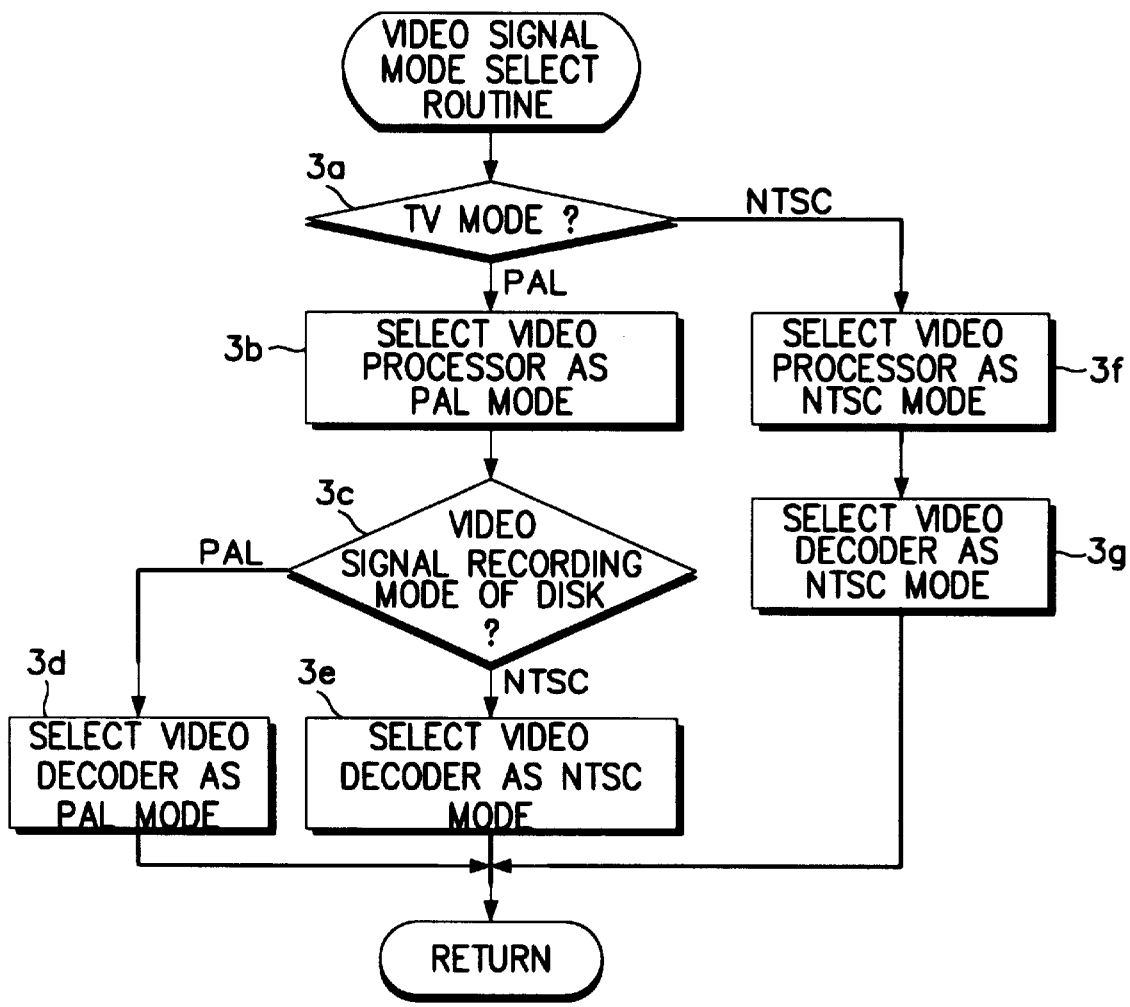
FIG. 3 is a flow chart illustrating a pseudo PAL video signal reproducing process according to the present invention.

FIG. 3 is a flow chart illustrating a pseudo PAL video signal reproducing process. If the user selects the television mode by using the key input section 70 before reproducing the information from the disk 100, the controller 60 checks the television mode which is to generate the video signal reproduced from the disk 100 at step 3a. If the television mode is the PAL system, the controller 60 selects the video processor 50 in the PAL mode at step 3b. The controller 60 checks the video signal recording mode of the disk 100 at step 3c to see whether the video signal reproduced from the disk 100 is the PAL system or the NTSC system. This is possible because the digital video disk has information indicating whether the video signal mode is recorded by the PAL system or NTSC system. If the video signal recording mode is the PAL system, the controller 60 selects the MPEG video decoder 40 in the PAL mode at step 3d so as to supply a PAL video signal to the television. If the video signal recording mode is the NTSC system, the controller 60 selects the video decoder 40 in the NTSC mode at step 3e so as to supply the pseudo PAL video signal to the television. Meanwhile, if the television mode is the NTSC system, the controller 60 selects the video processor 50 as the NTSC mode at step 3f. The controller 60 selects the video decoder 40 as the NTSC mode at step 3g so as to supply an NTSC video signal to the television.

The term "select" shown in blocks 3b, 3d, 3e, 3f and 3g of FIG. 3 means that the controller 60 generates command data (select signals) by use of the MPEG video decoder 40 or a data bus line connected to the video processor 50. An operational mode of the MPEG video decoder 40 or the video processor 50 is determined according to the command data generated in the controller 60.

Consequently, if the television is manufactured by the PAL system and the disk is manufactured by the NTSC system, the MPEG video decoder 40 is selected in the NTSC mode and the video processor 50 is selected in the PAL mode. Then the pseudo PAL video signal having the chrominance signal frequency of 4.43 MHz and the video synchronization signal of 30 Hz is generated.

As described above, there is no deterioration in picture quality according to a recording/reproducing mode. Furthermore, since there is no need to additionally install a pseudo PAL circuit and a variable component, the productivity is improved.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A pseudo Phase Alternation by Line (PAL) video signal reproducing apparatus for reproducing information of a digital video disk and transferring a reproduced signal to a television, said apparatus comprising:

an MPEG (Moving Picture Experts Group) video decoder to generate digital video data by decoding MPEG data stream reproduced from the information of said digital video disk in synchronization with a video clock supplied from exterior of said apparatus and to generate a PAL or National Television System Committee (NTSC) video synchronization signal;

a video processor to convert said digital video data to an analog video signal, and to generate a PAL or NTSC chrominance signal frequency;

a key input section to select a television mode which is to provide the information reproduced from said digital video disk in a PAL or NTSC mode by generating a television mode select information signal; and a controller to generate a first select signal to select said MPEG video decoder to generate the NTSC video synchronization signal in response to selection of the NTSC television mode and to generate a video synchronization signal which is dependent on a type of information reproduced from said digital video disk in response to selection of the PAL television mode, and to generate a second select signal to select said video processor in the PAL or NTSC mode according to the television mode select information supplied from said key input section and a type of the information reproduced from said digital video disk.

2. A pseudo PAL video signal reproducing apparatus as claimed in claim 1, wherein said controller comprises a microcomputer having a memory which stores a control program for selecting said MPEG video decoder and said video processor in the PAL or NTSC mode.

3. A method for reproducing a pseudo PAL video signal in a digital video disk reproducing apparatus having an MPEG (Moving Picture Experts Group) video decoder and a video processor, said method comprising the steps of:

determining a television mode of a television;

selecting said video processor in a PAL mode and checking a video signal mode recorded in said digital video disk in response to determining that said television mode is a Phase Alternation by Line (PAL) system; and selecting a mode of said video decoder to correspond to the video signal recording mode of said digital video disk.

4. A method for reproducing a video signal in a digital video disk reproducing apparatus having an MPEG (Moving Picture Experts Group) video decoder and a video processor, said method comprising the steps of:

determining a television mode of a television;

selecting said video processor in a PAL mode, and checking a video signal mode of information recorded in said digital video disk in response to determining that said television mode is a Phase Alternation by Line (PAL) system;

determining a video signal recording mode of a video disk;

selecting said video decoder in the PAL mode so as to supply a PAL video signal to the television in response to determining that the video signal recording mode is the PAL system;

selecting said video decoder in an NTSC mode so as to supply a pseudo PAL video signal to the television in response to determining that the video signal recording mode is an NTSC system; and selecting said video processor in the NTSC mode and selecting said video decoder in the NTSC mode so as to supply an NTSC video signal to the television in response to determining that the television mode is the NTSC system.

5. A pseudo Phase Alternation by Line (PAL) video signal reproducing apparatus for reproducing a Moving Pictures Experts Group (MPEG) generated from information of a digital video disk for display on a television in accordance with a video clock signal, said apparatus comprising:

an MPEG video decoder, having PAL and NTSC modes, to generate digital video data by decoding said MPEG data stream in synchronization with said video clock signal according to one of said PAL and NTSC modes;

a video processor, having said PAL and NTSC modes, to convert said digital video data to an analog video signal according to one of said PAL and NTSC modes; and a controller to select the PAL or NTSC mode of said video processor based upon a television mode of the television, and to select said NTSC mode of said video decoder if the television mode is NTSC, and to select a mode of said video decoder to correspond to a mode of the information reproduced from the digital video disk if the television mode is PAL.

6. A pseudo PAL video signal reproducing apparatus as claimed in claim 5, further comprising an input section to receive an input indicative of the television mode of the television.

7. A pseudo PAL video signal reproducing apparatus as claimed in claim 6, wherein said controller selects said PAL modes of said video processor and said MPEG video decoder if the television mode and the mode of information reproduced from the digital video disk is said PAL mode, selects said PAL mode of said video processor and said NTSC mode of said MPEG video decoder if the television mode is said PAL mode and the mode of information reproduced from the digital video disk is said NTSC mode, and selects said NTSC modes of said video processor and said MPEG video decoder if the television mode is said NTSC mode.

8. A pseudo PAL video signal reproducing apparatus as claimed in claim 7, wherein said controller selects said NTSC mode of said video decoder regardless of the mode of the information reproduced from the digital video disk.

9. A pseudo PAL video signal reproducing apparatus as claimed in claim 8, wherein said MPEG video decoder generates a video synchronization signal based upon the selection of mode of said MPEG video decoder by said controller, and transmits said video synchronization signal to said video processor to control processing of said digital video data.

10. A pseudo PAL video signal reproducing apparatus as claimed in claim 5, wherein said controller selects said PAL modes of said video processor and said MPEG video decoder if the television mode and the mode of information reproduced from the digital video disk is said PAL mode, selects said PAL mode of said video processor and said NTSC mode of said MPEG video decoder if the television mode is said PAL mode and the mode of information reproduced from the digital video disk is said NTSC mode, and selects said NTSC modes of said video processor and said MPEG video decoder if the television mode is said NTSC mode.

11. A pseudo PAL video signal reproducing apparatus as claimed in claim 10, wherein said controller selects said NTSC mode of said video decoder regardless of the mode of the information reproduced from the digital video disk.

12. A pseudo PAL video signal reproducing apparatus as claimed in claim 10, wherein said MPEG video decoder generates a video synchronization signal based upon the selection by said controller, and transmits said video synchronization signal to said video processor to control processing of said digital video data.

13. A pseudo PAL video signal reproducing apparatus as claimed in claim 12, wherein said video processor includes a clock generator to generate chrominance signals having different frequencies based upon the selection of mode of said video processor by said controller.

14. A pseudo PAL video signal reproducing apparatus as claimed in claim 13, wherein said clock generator generates a first chrominance signal having a frequency of 3.58 MHZ if said controller selects said video processor to be in said NTSC mode and generates a second chrominance signal having a frequency of 4.43 MHZ if said controller selects said video processor to be in said PAL mode.

15. A pseudo PAL video signal reproducing apparatus as claimed in claim 14, wherein said video processor receives said video clock signal from external of said PAL video signal reproducing apparatus and transfers said video clock signal to said MPEG video decoder.

16. A pseudo PAL video signal reproducing apparatus as claimed in claim 10, wherein said video processor includes a clock generator to generate chrominance signals having different frequencies based upon the selection of mode of said video processor by said controller.

17. A pseudo PAL video signal reproducing apparatus as claimed in claim 16, wherein said clock generator generates a first chrominance signal having a frequency of 3.58 MHZ if said controller selects said video processor to be in said NTSC mode and generates a second chrominance signal having a frequency of 4.43 MHZ if said controller selects said video processor to be in said PAL mode.

18. A pseudo PAL video signal reproducing apparatus as claimed in claim 5, wherein said video processor receives said video clock signal from external of said PAL video signal reproducing apparatus and transfers said video clock signal to said MPEG video decoder.

* * * * *